US012452032B2

(12) United States Patent
Balin et al.

(10) Patent No.: US 12,452,032 B2
(45) Date of Patent: Oct. 21, 2025

(54) MANAGING ACCESS TO SENSITIVE INFORMATION

(71) Applicant: Dell Products L.P., Round Rock, TX (US)

(72) Inventors: Maxim Balin, Gan-Yavne (IL); Roman Bober, Ashdod (IL); Stav Sapir, Beer Sheba (IL)

(73) Assignee: Dell Products L.P., Round Rock, TX (US)

( * ) Notice: Subject to any disclaimer, the term of this patent is extended or adjusted under 35 U.S.C. 154(b) by 154 days.

(21) Appl. No.: 18/426,970

(22) Filed: Jan. 30, 2024

(65) Prior Publication Data
US 2025/0247203 A1 Jul. 31, 2025

(51) Int. Cl.
*H04L 9/00* (2022.01)
*H04L 9/08* (2006.01)

(52) U.S. Cl.
CPC .............. *H04L 9/008* (2013.01); *H04L 9/088* (2013.01)

(58) Field of Classification Search
CPC ....................................................... H04L 9/008
See application file for complete search history.

(56) References Cited

U.S. PATENT DOCUMENTS

| 9,900,287 | B1* | 2/2018 | Jooste | H04L 9/14 |
| 10,187,361 | B2* | 1/2019 | Carlson | H04L 63/0442 |
| 10,404,667 | B2* | 9/2019 | Lyer | H04L 63/0478 |
| 10,904,230 | B2* | 1/2021 | Aluvala | H04L 63/123 |
| 12,069,164 | B2* | 8/2024 | Raza | H04L 9/0891 |
| 2017/0222804 | A1* | 8/2017 | Dewitt | H04L 9/0861 |

* cited by examiner

*Primary Examiner* — Simon P Kanaan
(74) *Attorney, Agent, or Firm* — WOMBLE BOND DICKINSON (US) LLP

(57) ABSTRACT

Methods and systems for managing data in a system comprising edge devices and a data transfer bus is disclosed. The data may be managed by encrypting with homomorphic encryption and storing the data in edge devices. The edge devices may be stored in a physically insecure locations and maintain encryption of the data between edge devices. The data that is stored and in an encrypted state may include personally identifiable information. Maintaining encryption of the personally identifiable information between edge devices may prevent exposure to memory of the edge devices. Preventing exposure to memory of the personally identifiable identification may prevent a likelihood of a malicious attack and/or malware from finding the personally identifiable information if the malicious attack and/or malware may monitor memory of the edge devices.

20 Claims, 6 Drawing Sheets

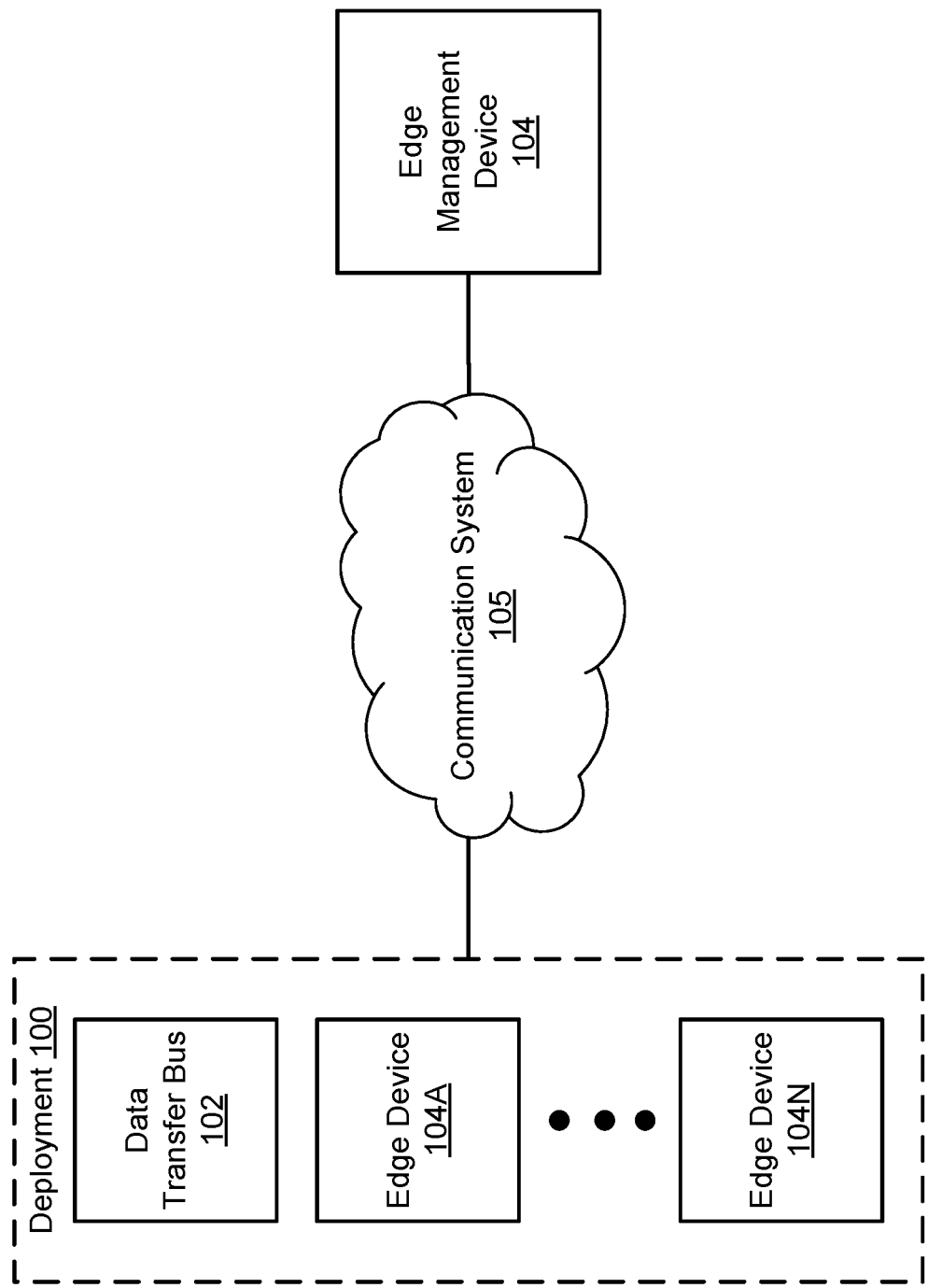

MANAGING ACCESS TO SENSITIVE INFORMATION

FIELD

Embodiments disclosed herein relate generally to managing information. More particularly, embodiments disclosed herein relate to managing access to sensitive information.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIG. 1 shows a diagram illustrating a system in accordance with an embodiment.

DETAILED DESCRIPTION

Figure 2A:
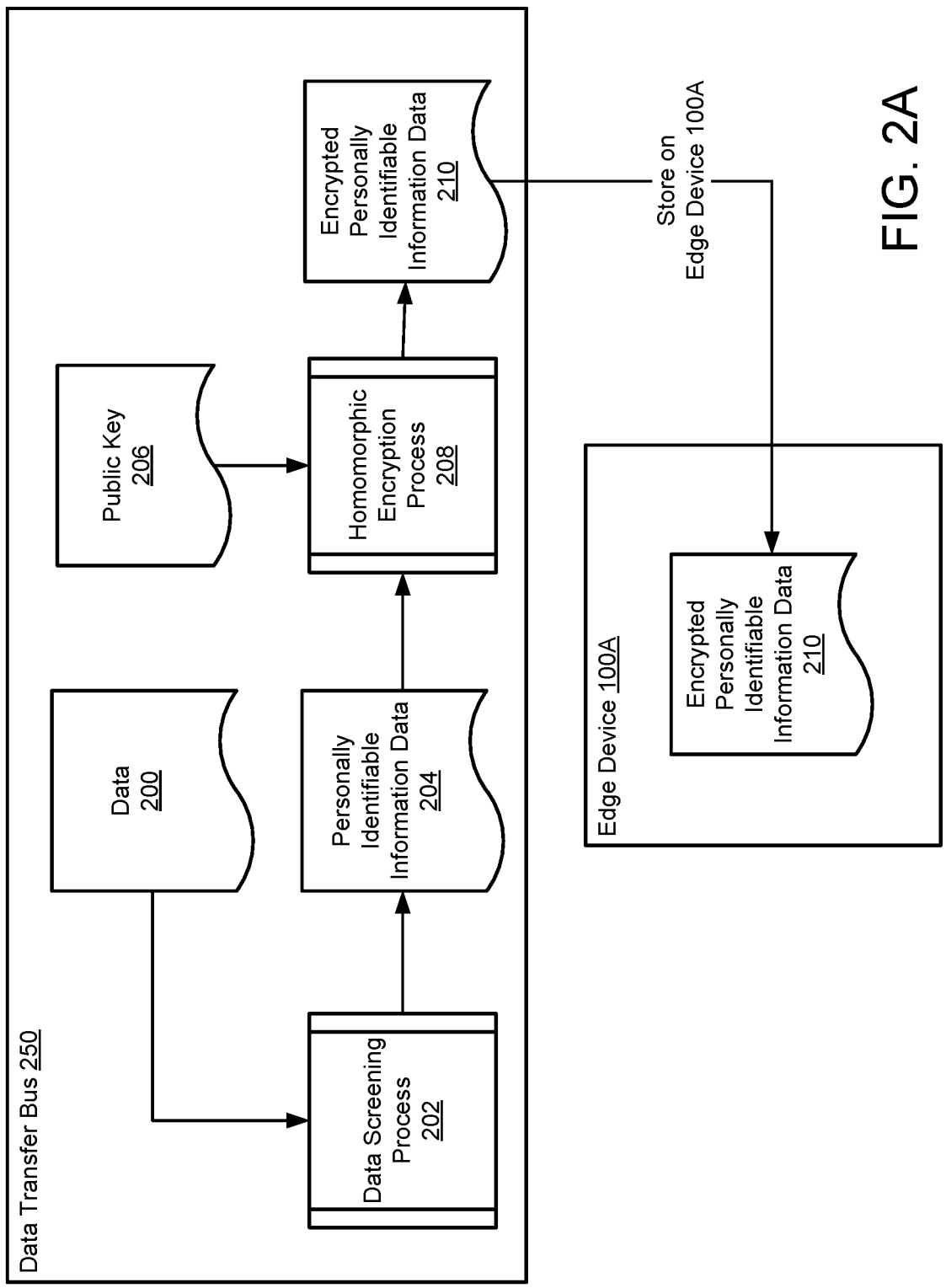
FIGS. 2A-2C show data flow diagrams illustrating operation of a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing data in a system comprising edge devices and a data transfer bus. The data may be managed by encrypting with homomorphic encryption and storing the data in edge devices. The edge devices may be stored in a physically insecure locations and maintain encryption of the data between edge devices.

The edge devices that store sensitive information such as personally identifiable information (PII) data that may be deployed to physically insecure locations may risk a possibility of a malicious attack and/or malware. The possibility of the malicious attack and/or the malware may increase the risk of unauthorized access to the sensitive information data. The malicious attack and/or the malware may monitor the memory of the edge devices for sensitive information data, while the edge devices perform operations with the sensitive information data.

To remove exposure of the sensitive information data on the memory of the edge devices while the edge devices perform operations with the sensitive information data, the sensitive information data may be encrypted using homomorphic encryption. Homomorphic encryption may allow for manipulation of the sensitive information data while in an encrypted state.

An edge device of the edge devices may also transfer and store sensitive information data while in an encrypted state to a second edge device of the edge devices using a data transfer bus. The data transfer bus may authorize and facilitate transfer of the sensitive information data while in an encrypted state and ensure that the sensitive information maintains an encrypted state.

In an embodiment, a method for managing data in a system comprising edge devices and a data transfer bus is disclosed. The method may include (i) obtaining a portion of the data for storage on an edge device of the edge devices, the edge devices being positioned in at least one physically insecure location; (ii) classifying the portion of the data with respect to a class of classes to obtain a data classification for the portion of the data; (iii) in a first instance of the classifying where the portion of the data is classified as a member of the class: (a) using homomorphic encryption to retain the portion of the data in an encrypted state while the portion of the data is stored in any of the edge devices; and (iv) in a second instance of the classifying where the portion of the data is not classified as a member of the class: (a) retaining the portion of the data in any of the edge devices without requiring use of the homomorphic encryption; and (b) evaluating the class of the data as being verified as not matching the first class.

The portion of the data includes personally identifiable information, the personally identifiable information facilitates identification of a person.

The physically insecure location includes a location that lacks data security and protection from any person, the person being capable of inflicting physical destruction or a malicious attack on the edge device of the edge devices.

Using homomorphic encryption to retain the portion of the data in an encrypted state includes performing an operation, by the edge device, on the portion of the data while in the encrypted state.

Performing an operation on the portion of the data includes (i) verifying the encrypted state of the portion of the data; and (ii) storing the portion of the data on an edge device.

Performing an operation on the portion of the data includes performing an arithmetic operation on the portion of the data.

Performing an operation on the portion of the data includes transferring, by the edge device of the edge devices to a second edge device of the edge devices, the portion of the data.

Classifying the portion of the data with respect to a class of classes includes (i) searching a file table of an operating system of the edge device of the edge devices for a file type or metadata for the data; (ii) making a determination regarding whether the metadata for the data comprises characteristics of the class of the classes; (iii) in a first instance of the determination where the metadata for the data comprises characteristics of the class of the classes: (a) classifying the data as the member of the class; and (iv) in a second instance of the determination where the metadata for the data does not comprise characteristics of the class of the classes: (a) evaluating the data as not being the member of the class.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the computer-implemented method when the computer instructions are executed by the processor.

Turning to FIG. 1, a system in accordance with an embodiment is shown. The system may provide any number and types of computer implemented services (e.g., to user of the system and/or devices operably connected to the system). The computer implemented services may include, for example, data storage service, instant messaging services, etc.

To provide the computer implemented services, edge devices may be deployed. The edge devices may be remote devices of a network that interface between the network and a remote area. Interfacing between the network and the remote area may include collecting data from the remote area, transferring the data from the remote area to the network and/or between edge devices in other remote areas, and/or manipulating the data from the remote area.

The data that the edge devices may collect, transfer, and/or manipulate may include sensitive information such as PII. PII may be any portion of information that may be used to identify someone. The PII may include a name, address, telephone, birthdate, and/or health data. The edge devices may collect, transfer, and/or manipulate the PII and/or other types of sensitive information because the edge devices may be responsible for safeguarding the PII for individuals associated with the network on which the edge devices operate.

To safeguard sensitive information, the edge devices may encrypt the sensitive information. Encryption, by use of a key, may render the sensitive information as a cyphertext, thus reducing the likelihood of exposing the sensitive information to entities that are not authorized to access the sensitive information. Only by decryption of the cyphertext of the sensitive information to a plaintext of the sensitive information may allow the sensitive information to be exposed.

Over time, the sensitive information managed by the edge devices may need to change (e.g., due to a change in the characteristics of a person associated with the sensitive information). To change the sensitive information, the sensitive may be decrypted, the sensitive information may be modified, and then the sensitive information may be encrypted again. However, while decrypted even if just in memory, the sensitive information may be access. Thus, if a host edge device for the sensitive data is compromised, then the sensitive information may be compromised during modification.

In general, embodiments disclosed here relate to systems and methods for securing sensitive information. The sensitive information may be secured using encryption. The encryption may allow for the sensitive information to be modified without decrypting encrypted sensitive information. Consequently, even if a host edge device is compromised, encrypted sensitive information stored on the host edge device may not be compromised even if modified.

The sensitive information may include PII. The sensitive information may be encrypted using homomorphic encryption. Homomorphic encryption may be used to secure the sensitive information to prevent the sensitive information from being exposed, even during modification. The sensitive information may be prevented from being exposed in memory because homomorphic encryption, unlike conventional encryption methods, permits manipulation of the data while encrypted.

Using homomorphic encryption, a cyphertext that includes sensitive information may be manipulated to apply changes to the sensitive information as if the sensitive information was in plaintext. For example, arithmetic computations, including addition, subtraction, multiplication, and/or division, may be performed on the cyphertext of the sensitive information. Results of arithmetic computations done with the cyphertext of the data may be similar to results of arithmetic computations done with plaintext of the data.

Edge devices may apply homomorphic encryption for sensitive information and perform manipulations of the PII while encrypted. Application of homomorphic encryption by the edge devices may ensure that only cyphertext of sensitive information may be used by the edge devices. Through using the cyphertext of the sensitive information, plaintext of the sensitive information may not be exposed to the edge devices. Since the plaintext of the sensitive information may not be written to the memory of the edge devices, malware or a malicious attacker that observes activities on the edge devices may not be able to observe the plaintext of the sensitive information in the memory of the edge devices.

By doing so, embodiment disclosed herein may facilitate secure storage of sensitive information even while edge devices that host the sensitive information are compromised.

To provide the above noted functionality, the system may include deployment 100, and edge management device 104. Each of these components is discussed below.

Deployment 100 may include data transfer bus 102 and any number of edge device 104A-104N. The edge devices may provide all, or a portion, of the computer implemented services provided by the system of FIG. 1.

During operation, edge devices 100A-100N may (i) encrypt sensitive information using homomorphic encryption, (ii) store the encrypted sensitive information securely, (iii) authorize other edge devices to provide encrypted sensitive information, (iv) receive encrypted sensitive information from another edge device after authorization, (v) authenticate the encrypted sensitive information after receiving the encrypted sensitive information, (vi) perform arithmetic operations on the encrypted sensitive information, and (vii) maintain security and integrity of the encrypted sensitive information while transferring and storing the sensitive information.

The homomorphic encryption of the sensitive information may occur using encryption keys provided by edge management device 104. Edge devices 100A-100N may authorize transfer of the encrypted sensitive information to prevent unauthorized access to the sensitive information. Edge devices 100A-100N may receive the encrypted sensitive information through secure transfer by data transfer bus 100A. Edge devices 100A-100N may authenticate the encrypted sensitive information that is received from data transfer bus 100A by ensuring the content of the data matches a class of sensitive information and ensuring the data transferred via the secure transfer is homomorphically encrypted.

Edge management device 104 may manage computer implemented services provided by deployment 100. To do so, edge management device 104 may (i) generate encryption keys, (ii) provide hardware and software updates to edge devices 100A-100N, (iii) manage priorities for edge devices 100A-100N, (vi) receive the sensitive information from one of edge devices 100A-100N, (v) send the sensitive information to any of edge devices 100A-100N, and (vi) secure the transfer of the sensitive information while in transit. Edge management device 104 may generate encryption keys by making public keys for edge devices 100A-100N and making private keys with which to decrypt sensitive information. Edge management device 104 may provide hardware and software updates by transmitting new information to edge devices 100A-100N which may regulate hardware and software processes. Edge management device 104 may manage priorities of edge devices 100A-100N by developing and enforcing protocols for edge devices 100A-100N by which sensitive information may be handled. During the transfer process of the sensitive information, edge management device 104 may ensure the transfer of the sensitive information by ensuring that the sensitive information is homomorphically encrypted during the transfer.

Figure 2B:
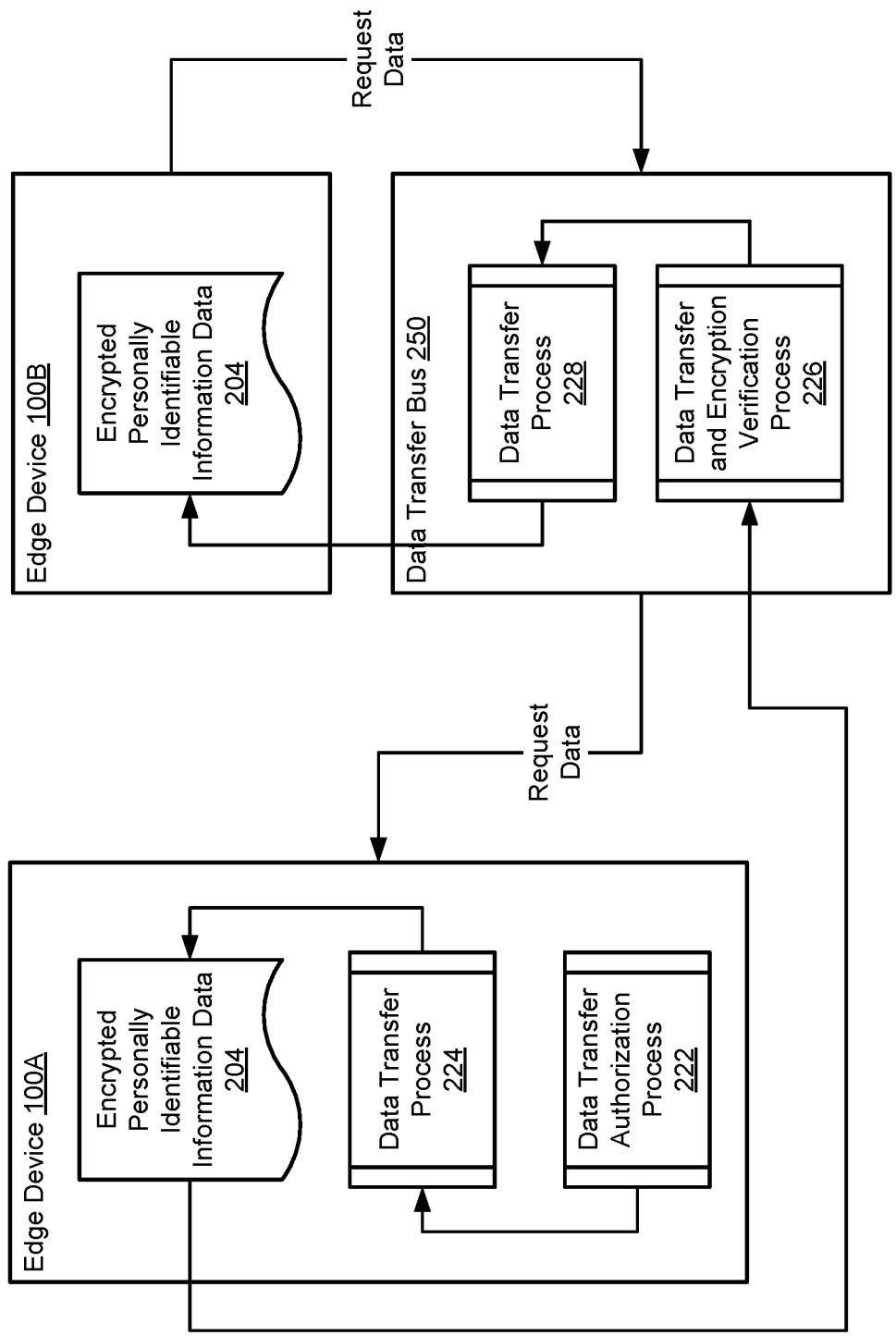
Figure 2C:
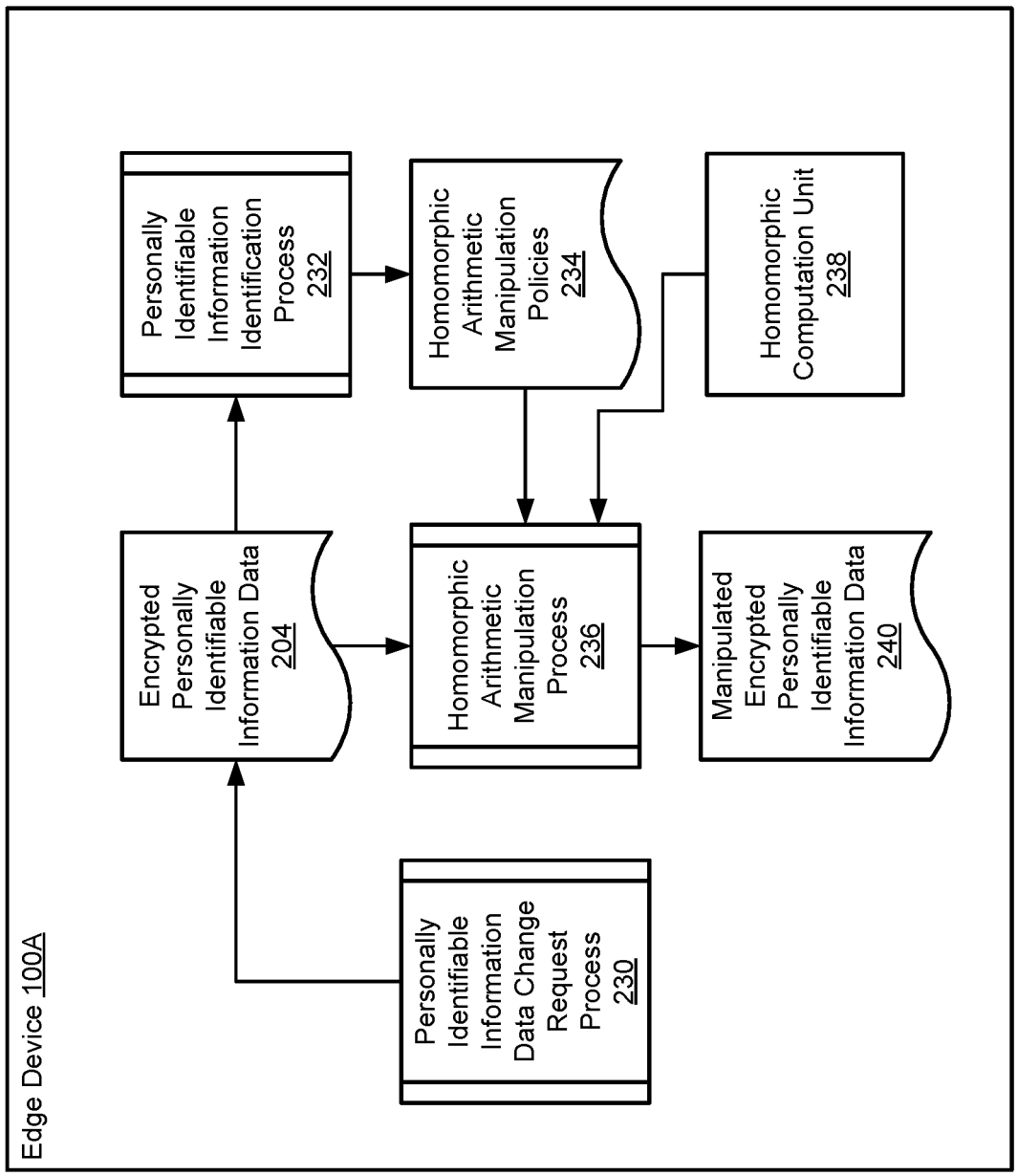
Figure 3:
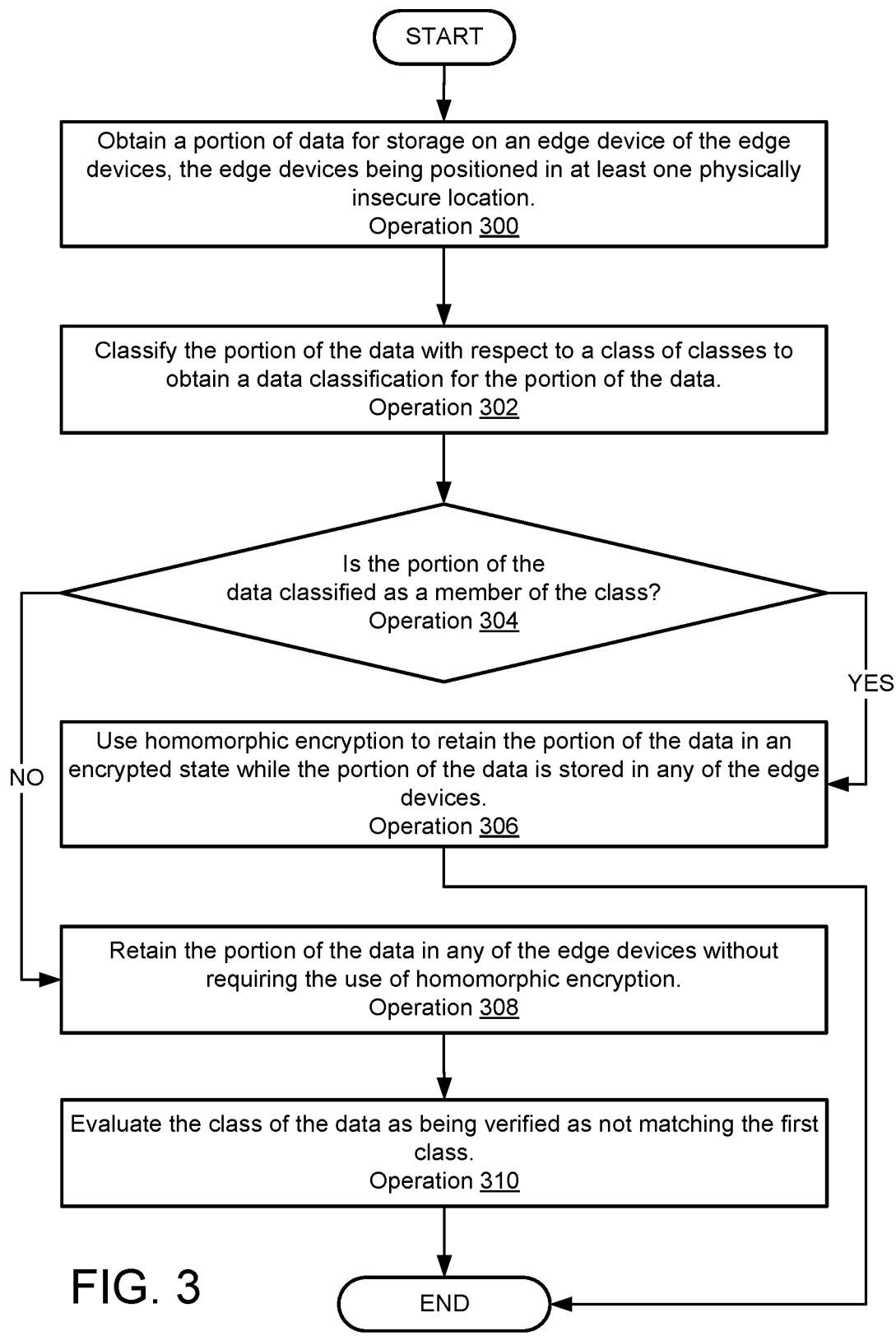
FIG. 3 shows a flow diagram illustrating a method in accordance with an embodiment.

While providing their functionality, any of deployment 100 and edge management device 104 may perform all, or a portion, of the flows and methods shown in FIGS. 2A-3.

Any of (and/or components thereof) deployment 100 and edge management device 104 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 102. In an embodiment, communication system 102 includes one or more networks that facilitate communication between any number of components. The networks may include wired networks and/or wireless networks (e.g., and/or the Internet). The networks may operate in accordance with any number and types of communication protocols (e.g., such as the Internet protocol).

While illustrated in FIG. 1 as including a limited number of specific components, a system in accordance with an embodiment may include fewer, additional, and/or different components than those components illustrated therein.

To further clarify embodiments disclosed herein, data flow diagrams in accordance with an embodiment are shown in FIGS. 2A-2C. In these diagrams, flows of data and processing of data are illustrated using different sets of shapes. A first set of shapes (e.g., 200, 206, 220, etc.) is used to represent data structures and a second set of shapes (e.g., 202, 208, 222, etc.) is used to represent processes performed using and/or that generate data.

Turning to FIG. 2A, a first data flow diagram in accordance with an embodiment is shown. The first data flow diagram may illustrate data used in and data processing performed in identification and storage of sensitive information data on an edge device.

During the process of storing sensitive information data on edge device 100A, data 200 may be identified by a user and/or an application within data transfer bus 250. The user and/or the application may attempt to transfer data 200 from data transfer bus 250 to edge device 100A and store data 200 on edge device 100A. Data 200 may have any classification of data type. A classification of data 200 may need to be identified to determine whether data 200 may be encrypted on edge device 100A, as edge device 100A may be used to store sensitive information data. To determine whether data 200 may be encrypted on edge device 100A, data 200 may undergo data screening process 202.

During data screening process 202, a source of data 200 may be queried to verify whether data 200 includes sensitive information data and/or a matching process may be implemented to verify if data 200 may include sensitive information. If data 200 is verified to include sensitive information data either by the source of data 200 or by the matching process, then data 200 may be considered to be personally identifiable information data 204.

For data that is sensitive information data, policies or other governance data may require that the sensitive information data be encrypted before being stored and not be decrypted while stored in the system. Encryption of personally identifiable information data 204 before storing on edge device 100A may keep unencrypted copies of personally identifiable information data 204 from being in memory on edge device 100A. However, operations which may change characteristics of personally identifiable information data 204 by edge device 100A may need to be done. To allow for changing characteristics of personally identifiable information data 204 while encrypted, personally identifiable information data 204 may be encrypted using homomorphic encryption. To homomorphically encrypt personally identified information data 204, homomorphic encryption process 208 may be performed.

During homomorphic encryption 208, personally identifiable information data 204 may be encrypted with public key 206. Public key 206 may be provided by data transfer bus 250. Public key 206 may enable homomorphic encryption of personally identifiable information data 204 to yield encrypted personally identifiable information data 210.

As encrypted personally identifiable information data 210 has been identified as including sensitive information data and has been homomorphically encrypted, it may be stored on edge device 100A with little risk of the sensitive information data being obtained by a malicious entity. Sensitive information data may be stored within encrypted personally identifiable information data 210 on edge device 100A. Operations may also be performed with encrypted personally identifiable information data 210. Operations with personally identifiable information data 210 may include transferring encrypted personally identifiable information data 210 to other edge devices within edge device 100B-100N and/or changing the characteristics of encrypted personally identifiable information data 210.

Turning to FIG. 2B, a second data flow diagram in accordance with an embodiment is shown. The second data flow diagram may illustrate data used in and data processing performed in verification and transfer of sensitive information data from one edge device to another edge device.

A request for encrypted personally identifiable information data 204 may be made by edge device 100B. The request may be made so that edge device 100B may obtain encrypted personally identifiable information data 204. To make the request, edge device 100B may send the request for encrypted personally identifiable information data 204 to data transfer bus 250. Data transfer bus 250 may pass the request to edge device 100A which stores encrypted personally identifiable information data 204. To process the request, data transfer authorization process 222 may be performed.

During data transfer authorization process 222, edge device 100A may confirm that the request is made by another edge device in deployment 100. Also, edge device 100A may ensure that it has in storage the data requested by edge device 100B. Once edge device 100A confirms which edge device made the request and that edge device 100A has encrypted personally identifiable information data 204 in storage, data transfer 224 may be performed.

During data transfer 224, a transaction may be made between edge device 100A and data transfer bus 250. The transaction may include transfer of encrypted personally identifiable information data 204 from edge device 100A to data transfer bus 250. Once data transfer bus 250 receives encrypted personally identifiable information data 204, data transfer and encryption verification process 224 may be performed.

During data transfer and encryption verification process 224, data transfer bus 250 may (i) check whether encrypted personally identifiable information data 204 includes sensitive information data and (ii) verify that encrypted personally identifiable information data 204 is homomorphically encrypted. Once inclusion of sensitive information data and homomorphic encryption of encrypted personally identifiable information data 204 has been verified, data transfer process 228 may be performed.

During data transfer 228, a transaction may be made between the data transfer bus 250 and edge device 100B. The transaction may include transfer of encrypted personally identifiable information data 204 from data transfer bus 250 to edge device 100B. Once edge device 100B receives encrypted personally identifiable information data 204, encrypted personally identifiable information data 204 may be stored on edge device 100B.

Turning to FIG. 2C, a third data flow diagram in accordance with an embodiment is shown. The third data flow diagram may illustrate data used in and data processing performed in manipulation of encrypted sensitive information data without decryption of the sensitive information data.

Personally identifiable information data change request process 230 may be initiated by a user and/or an application. Personally identifiable information data change request process 230 may include a modification to sensitive information data in encrypted personally identifiable information data 204. The modification may, for example, be a change in name, address, birthdate, age, or health data. To ensure personally identifiable information data change request process 230 initiates a modification of sensitive information data in encrypted personally identifiable information data 204, personally identifiable information identification process 232 may begin.

During personally identifiable information identification process 232, a query may be made in a file table in an operating system of edge device 100A. The query may search for a sensitive information file type or sensitive information metadata entry associated with encrypted personally identifiable information data 204. Once the sensitive information file type or sensitive information metadata entry is found, encrypted personally identifiable information data 204 may be confirmed to have sensitive information data.

With sensitive information data confirmed for encrypted personally identifiable information data 204, homomorphic arithmetic manipulation policies 234 may be implemented.

Homomorphic arithmetic manipulation policies 234 may list rules on how encrypted personally identifiable information data 204 may be modified. For example, since encrypted personally identifiable information data 204 is encrypted, homomorphic arithmetic manipulation policies 234 may govern when an age within the PI data of encrypted personally identifiable information data 204 may be incremented. As another example, homomorphic arithmetic manipulation policies 234 may govern what characteristics of health data may be unchangeable by a user. With homomorphic arithmetic manipulation policies 234, homomorphic arithmetic manipulation process 236 may be performed.

During homomorphic arithmetic manipulation process 236, manipulations may be made to characteristics of encrypted personally identifiable information data 204. The manipulations may be regulated by homomorphic arithmetic manipulation policies 234. The manipulations may be generated using homomorphic computation unit 238. [NEED DETAILS OF THIS].

As an example, blood glucose concentration levels listed in encrypted personally identifiable information data 204 may be unchangeable by a user because they may be determining factors on whether a person has diabetes and may only be changed with special authorization.

As a second example, using a notation of ENC (- - - -) that specifies encryption of the number or figure within the parentheses, encrypted personally identifiable information data 204 may use an ENC (birthdate) and an ENC (current date) to determine an age of a person. If the ENC (birthdate) is ENC (Jan. 20, 1990) and ENC (current date) is ENC (January 30, 2020), then edge device 100A may determine that ENC (thirty years) and ENC (ten days) may have passed. After noting that ENC (Jan. 20, 1990) to ENC (Jan. 20, 2020) is ENC (thirty years), edge device 100A may subtract the days between ENC (Jan. 20, 2020) and ENC (Jan. 30, 2020). In encrypted personally identifiable information data 204, a subtraction between these dates may be noted as ENC(30)−ENC(20)=ENC(10). Since ENC(10) is not greater than ENC (365), the number of days within a year, another ENC (year) is not added to ENC (thirty years).

An age computation for encrypted personally identifiable information data 204, specifically after personally identifiable information data change request 230 has been made or a birthday has passed, may yield manipulated encrypted personally identifiable information data 240. Manipulated encrypted personally identifiable information data 240 may include one or more manipulations of numbers or figures performed while encrypted.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIG. 1 may perform various methods to manage data processing systems. FIG. 3 illustrates a method that may be performed by the components of the system of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method of managing data in a system comprising edge devices and a data transfer bus in accordance with an embodiment is shown. The method may be performed, for example, by any of the components of the system of FIG. 1, and/or other components not shown therein.

At operation 300, a portion of data for storage on an edge device of the edge devices may be obtained, the edge devices being positioned in at least one physically insecure location. The portion of the data for storage may be obtained by receiving the portion of the data from a second edge device of the edge devices or a source not including the edge devices.

At operation 302, the portion of the data may be classified with respect to a class of classes to obtain a data classification for the portion of the data. The portion of the data may be classified by (i) searching a file table of an operating system of the edge device of the edge devices for a file type or metadata for the data and (ii) making a determination regarding whether the metadata for the portion of the data comprises characteristics of the class of the classes. A file table of an operating system may be searched by starting, by the edge device of the edge devices, a process in the kernel of the operating system of the edge device of the edge devices. The process may search for the file type or the metadata for entries relating to the class of the classes.

A determination may be made by evaluating whether the file type or the metadata include characteristics of the class of the classes. The portion of the data may be classified as a member of the class in a first instance of the determination where the metadata for the data comprises characteristics of the class of the classes. The portion of the data may be evaluated as not being a member of the class in a second instance of the determination where the metadata for the portion of the data does not comprise characteristics of the class of the classes. The data may be classified as a member of the class by listing the data classification of the class in the metadata of the data. The portion of the data may be evaluated as not being a member of the class by not listing the data classification of the class in the metadata of the data.

At operation 304, a determination may be made regarding whether the portion of the data is classified as a member of the class. The determination may be made by searching for the data classification in the portion of the data. The data classification may be found using the file table of the operating system for the edge device of the edge devices. The file table can be used to look up the data classification in portion of the data.

If the portion of the data is classified as a member of the class, then the method may proceed at operation 306. If the portion of the data is not classified as a member of the class, then the method may proceed at operation 308.

At operation 306, homomorphic encryption may be used to retain the portion of the data in an encrypted state while the portion of the data is stored in any of the edge devices. Homomorphic encryption may be used by performing an operation, by the edge device, on the portion of the data while in the encrypted state. The operation may be performed on the portion of the data while in the encrypted state by verifying the encrypted state of the portion of the data; and storing the portion of the data on an edge device.

The encrypted state of the portion of the data may be verified by querying the metadata of the portion of the data. The metadata of the portion of the data may appear as a cyphertext. If the metadata of the portion of the data may appear as the cyphertext, then the portion of the data may be in the encrypted state. Otherwise, if the metadata of the portion of the data may not appear as the cyphertext, then the portion of the data may not be in the encrypted state.

The portion of the data may be stored on an edge device by transferring the portion of the data to a storage component of the edge device of the edge devices. The portion of the data may have the data classification and may be in the encrypted state using homomorphic encryption.

An operation may be also performed on the portion of the data by performing an arithmetic operation on the portion of the data. The arithmetic operation may be performed on the portion of the data by implementing arithmetic manipulation policies to govern the arithmetic operation and implementing a homomorphic computational unit to evaluate the arithmetic operation. The edge device of the edge devices may extract values from the portion of the data, the homomorphic computational unit may evaluate the arithmetic operation using the values to generate a second value, and the edge device of the edge devices may write the second value to the portion of the data.

An operation may be also performed on the portion of the data by transferring, by the edge device of the edge devices to a second edge device of the edge devices, the portion of the data. The edge device of the edge devices may transfer the portion of the data to the second edge device by transferring the portion of the data to a data transfer bus. The data transfer bus may ensure that the portion of the data has the data classification and is the encrypted state using homomorphic encryption. Once the portion of the data has the data classification is the encrypted state using homomorphic encryption, the portion of the data may be transferred from the data transfer bus to the second edge device.

Returning to operation 304, at operation 308, the portion of the data may be retained without requiring the use of homomorphic encryption. The portion of the data may be retained by transferring the portion of the data to a storage component of the edge device of the edge devices. The portion of the data may not be in the encrypted state using homomorphic encryption.

At operation 310, the class of the data may be evaluated as being verified as not matching the first class. The class of the data may be evaluated by omitting a listing for the data classification in the metadata of the portion of the data or listing a second data classification in the metadata of the portion of the data. The portion of the data may not have the data classification in the metadata of the portion of the data.

The method may end following operation 310.

Figure 4:
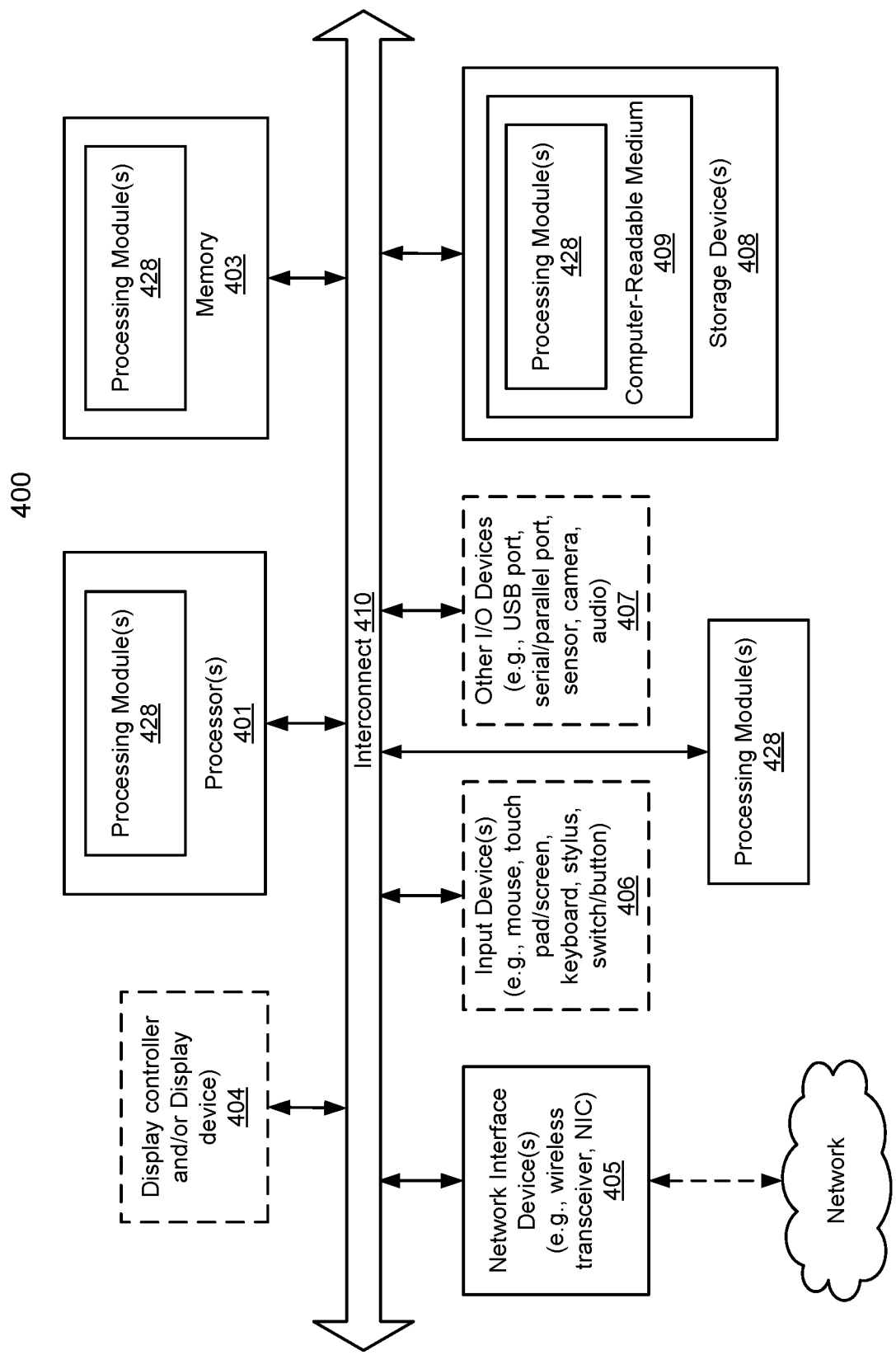
FIG. 4 shows a block diagram illustrating a data processing system in accordance with an embodiment.

Any of the components illustrated in FIGS. 1-2C may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing data in a system comprising edge devices and a data transfer bus, the method comprising:
obtaining a portion of the data for storage on an edge device of the edge devices, the edge devices being positioned in at least one physically insecure location;

classifying the portion of the data with respect to a class of classes to obtain a data classification for the portion of the data;
in a first instance of the classifying where the portion of the data is classified as a member of the class:
using homomorphic encryption to retain the portion of the data in an encrypted state while the portion of the data is stored in any of the edge devices;
in a second instance of the classifying where the portion of the data is not classified as a member of the class:
retaining the portion of the data in any of the edge devices without requiring use of the homomorphic encryption; and
evaluating the class of the portion of the data as being verified as not matching the class.

2. The method of claim 1, wherein the portion of the data comprises personally identifiable information, the personally identifiable information facilitates identification of a person.

3. The method of claim 1, wherein the physically insecure location comprises a location that lacks data security and protection from any person, the person being capable of inflicting physical destruction or a malicious attack on the edge device of the edge devices.

4. The method of claim 1, wherein using homomorphic encryption to retain the portion of the data in an encrypted state comprises:
performing an operation, by the edge device, on the portion of the data while in the encrypted state.

5. The method of claim 4, wherein performing the operation on the portion of the data comprises:
verifying the encrypted state of the portion of the data; and
storing the portion of the data on an edge device.

6. The method of claim 4, wherein performing the operation on the portion of the data comprises:
performing an arithmetic operation on the portion of the data.

7. The method of claim 4, wherein performing the operation on the portion of the data comprises:
transferring, by the edge device of the edge devices to a second edge device of the edge devices, the portion of the data.

8. The method of claim 1, wherein classifying the portion of the data with respect to the class of classes comprises:
searching a file table of an operating system of the edge device of the edge devices for a file type or metadata for the data;
making a determination regarding whether the metadata for the data comprises characteristics of the class of the classes;
in a first instance of the determination where the metadata for the data comprises characteristics of the class of the classes:
classifying the data as the member of the class; and
in a second instance of the determination where the metadata for the data does not comprise characteristics of the class of the classes:
evaluating the data as not being the member of the class.

9. A non-transitory machine-readable medium having instructions stored therein, which when executed by a processor, cause the processor to perform operations for managing data in a system comprising edge devices and a data transfer bus, the operation comprising:
obtaining a portion of the data for storage on an edge device of the edge devices, the edge devices being positioned in at least one physically insecure location;
classifying the portion of the data with respect to a class of classes to obtain a data classification for the portion of the data;
in a first instance of the classifying where the portion of the data is classified as a member of the class:
using homomorphic encryption to retain the portion of the data in an encrypted state while the portion of the data is stored in any of the edge devices;
in a second instance of the classifying where the portion of the data is not classified as a member of the class:
retaining the portion of the data in any of the edge devices without requiring use of the homomorphic encryption; and
evaluating the class of the data as being verified as not matching the class.

10. The non-transitory machine-readable medium of claim 9, wherein the portion of the data comprises personally identifiable information, the personally identifiable information facilitates identification of a person.

11. The non-transitory machine-readable medium of claim 9, wherein the physically insecure location comprises a location that lacks data security and protection from any person, the person being capable of inflicting physical destruction or a malicious attack on the edge device of the edge devices.

12. The non-transitory machine-readable medium of claim 9, wherein using homomorphic encryption to retain the portion of the data in an encrypted state comprises:
performing an operation, by the edge device, on the portion of the data while in the encrypted state.

13. The non-transitory machine-readable medium of claim 12, wherein performing the operation on the portion of the data comprises:
verifying the encrypted state of the portion of the data; and
storing the portion of the data on an edge device.

14. The non-transitory machine-readable medium of claim 12, wherein performing the operation on the portion of the data comprises:
performing an arithmetic operation on the portion of the data.

15. A data processing system, comprising:
a processor; and
a memory coupled to the processor to store instructions, which when executed by the processor, cause the processor to perform operations for managing data in a system comprising edge devices and a data transfer bus, the operations comprising:
obtaining a portion of the data for storage on an edge device of the edge devices, the edge devices being positioned in at least one physically insecure location;
classifying the portion of the data with respect to a class of classes to obtain a data classification for the portion of the data;
in a first instance of the classifying where the portion of the data is classified as a member of the class:
using homomorphic encryption to retain the portion of the data in an encrypted state while the portion of the data is stored in any of the edge devices;
in a second instance of the classifying where the portion of the data is not classified as a member of the class:

retaining the portion of the data in any of the edge devices without requiring use of the homomorphic encryption; and evaluating the class of the data as being verified as not matching the class.

16. The data processing system of claim 15, wherein the portion of the data comprises personally identifiable information, the personally identifiable information facilitates identification of a person.

17. The data processing system of claim 15, wherein the physically insecure location comprises a location that lacks data security and protection from any person, the person being capable of inflicting physical destruction or a malicious attack on the edge device of the edge devices.

18. The data processing system of claim 15, wherein using homomorphic encryption to retain the portion of the data in an encrypted state comprises:

performing an operation, by the edge device, on the portion of the data while in the encrypted state.

19. The data processing system of claim 18, wherein performing the operation on the portion of the data comprises:

verifying the encrypted state of the portion of the data; and storing the portion of the data on an edge device.

20. The data processing system of claim 18, wherein performing the operation on the portion of the data comprises:

performing an arithmetic operation on the portion of the data.

* * * * *